(No Model.)

J. DAVIDSON & J. TAYLOR.
SAFETY LAMP.

No. 414,377. Patented Nov. 5, 1889.

on line y-y

Witnesses:
W. W. Mortimer
F. Stanly Elmore

Inventor:
John Davidson
John Taylor
By their Atty. P. T. Dodge

UNITED STATES PATENT OFFICE.

JOHN DAVIDSON AND JOHN TAYLOR, OF GUELPH, ONTARIO, CANADA.

SAFETY-LAMP.

SPECIFICATION forming part of Letters Patent No. 414,377, dated November 5, 1889.

Application filed April 5, 1888. Serial No. 269,714. (No model.)

*To all whom it may concern:*

Be it known that we, JOHN DAVIDSON and JOHN TAYLOR, citizens of Canada, and residents of Guelph, in the county of Wellington and Province of Ontario, have invented certain new and useful Improvements in Safety-Lamps, of which the following is a specification.

Our invention relates to certain improvements in what are commonly termed "safety-lamps," in which a chamber containing an extinguishing-fluid is combined with the burner of the lamp in such a manner that in the event of the overturning of the latter the extinguishing-fluid will be directed upon the wick and surroundings.

The invention consists in the details of construction and combination of parts hereinafter described and claimed.

Figure 1:
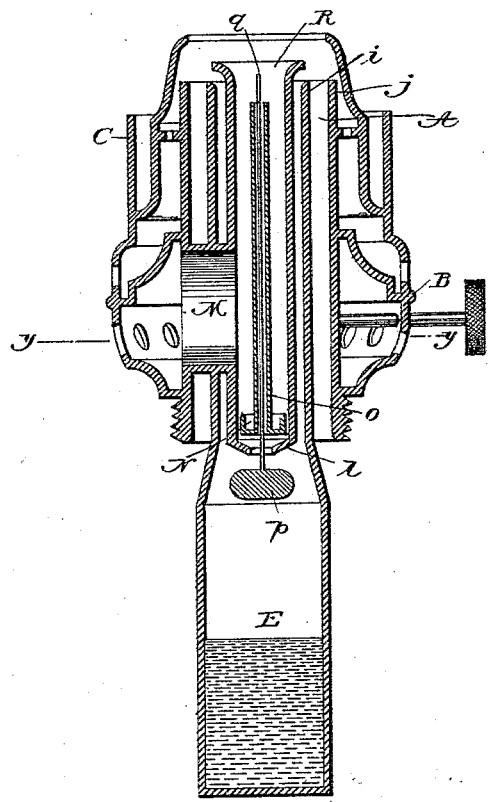
Figure 2:
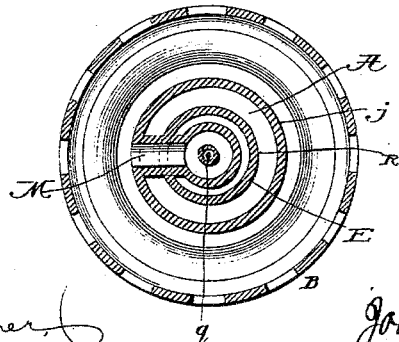

In the annexed drawings, which illustrate our invention, Figure 1 is a vertical longitudinal section through a lamp-burner having our invention applied thereto. Fig. 2 is a horizontal section of the same on the line y y.

A represents the wick-tube having the outer and inner walls, B the gallery, and C the condenser, constructed in the usual manner.

The essential element of our invention consists in the vessel E for holding the quenching-fluid, and which is soldered or otherwise secured to the burner, as shown in the drawings. The neck of this vessel is made cylindrical and forms the inner wall of the wick-passage, and the body or lower part is made as large as the opening of the fount will allow to pass easily through it. The top end of the neck i and that of the outside wall j of the wick-passage are made even in height. A cylindrical tube R, having an open funnel-shaped bottom l, and having its upper end turned outward over the wick, is supported centrally in the wick-tube by the walls of the air-passage M, which are secured to the outer and inner walls of the wick-passage. This tube R forms the inner wall of the neck of the vessel E, and by having its upper end flared outward in the direction of the surrounding wick-passage the fluid will be directed over and upon the wick. The inner wall of the wick-passage has its upper inner edge beveled or rounded off to correspond with the flaring mouth of the passage R, and serves to assist in directing the fluid upon the wick.

In filling the vessel E the extinguishing-fluid is introduced between the inner walls of the wick-tube and the outer walls of the air-passage R. A small basket N, having a tubular handle or stem o, is placed in the tube R and rests upon the funnel l. This basket is for catching any trimmings that might drop from the wick and preventing their getting into the quenching-fluid. A float p rides upon the surface of the fluid and by the wire q, which is attached to it, and which extends up through the stem o, indicates the quantity of fluid that is in the vessel. Fresh air is admitted to the inside of round wicks through the air-passage M, and thus insures a perfect combustion.

Having thus described our invention, what we claim as new, and desire to secure by Letters Patent, is—

1. In a lamp-burner, the combination of the exterior stage or body, the wick-tube composed of the outer and inner walls adapted to receive a tubular wick, the said outer wall being attached to the stage and the inner wall provided with the water-containing vessel, the central air-tube and the lateral air-inlet having its walls attached to the outer wall of the wick-tube and serving to sustain the inner wall of the wick-tube and the central air-tube.

2. In an oil-lamp, the combination of a vessel for holding a quenching-fluid and which extends to the top of the wick-tube, with a cylindrical tube attached to the wick-tube by the walls of an air-passage, and having an open funnel-shaped bottom and a bell-mouth top, substantially as shown, and for the purpose set forth.

3. The combination of the outer wall j of the wick-tube, the walls of the air-passage M, and the quenching-fluid vessel E, the tube R, having an open funnel-shaped bottom and bell-mouth top, with the basket N, stem o, float p, and its wire handle q, substantially as shown, and for the purpose set forth.

Signed at Guelph this 10th day of March, 1888.

JOHN DAVIDSON.
JOHN TAYLOR.

In presence of—
ROB. H. RODGER,
W. G. W. GARNHAM.